United States Patent [19]

Benton et al.

[11] 4,347,712
[45] Sep. 7, 1982

[54] MICROPROCESSOR DISCHARGE TEMPERATURE AIR CONTROLLER FOR MULTI-STAGE HEATING AND/OR COOLING APPARATUS AND OUTDOOR AIR USAGE CONTROLLER

[75] Inventors: Ronald Benton, Minneapolis; Kenneth B. Kidder, Coon Rapids; Robert L. Linderberg, Bloomington; Timothy M. Tinsley, Coon Rapids; Curtis E. Westley, St. Louis Park, all of Minn.

[73] Assignee: Honeywell Inc., Minneapolis, Minn.

[21] Appl. No.: 202,985

[22] Filed: Nov. 3, 1980

[51] Int. Cl.³ ........................... F25B 7/00; F25B 29/00
[52] U.S. Cl. ........................................ 62/175; 62/180; 165/16; 236/49
[58] Field of Search ................ 236/1 EA, 49; 62/175, 62/180; 165/22, 16

[56] References Cited
U.S. PATENT DOCUMENTS

| | | | |
|---|---|---|---|
| 4,136,732 | 1/1979 | Demaray et al. | 165/22 X |
| 4,215,408 | 7/1980 | Games et al. | 165/22 |
| 4,253,153 | 2/1981 | Bitterli et al. | 165/22 X |

OTHER PUBLICATIONS
Honeywell W945A-G 6/1977.
Honeywell H205A 4/1977.

Primary Examiner—William E. Wayner
Attorney, Agent, or Firm—Clyde C. Blinn

[57] ABSTRACT

An air conditioning system furnishing temperature conditioned air to a plurality of zones each of which has its own zone damper controlled by its own space thermostat. The system has an air discharge temperature sensor downstream of the temperature conditioning heat exchanger which is connected to a microprocessor controller for controlling a plurality of stages of temperature conditioning apparatus such as heating or cooling apparatus and a damper motor control for controlling the entry of outdoor air into the system. A reset thermal comfort sensor located in a representative zone or area is connected to the microprocessor controller for varying the controlled temperature of the supplied discharge air by operating the outdoor air damper motor and the multi-stage temperature conditioning apparatus to maintain the best use of outdoor air for cooling and the most efficient operation of refrigeration cooling apparatus by ensuring maximum air delivery to the heat exchangers during the operation of the mechanical cooling apparatus.

12 Claims, 9 Drawing Figures

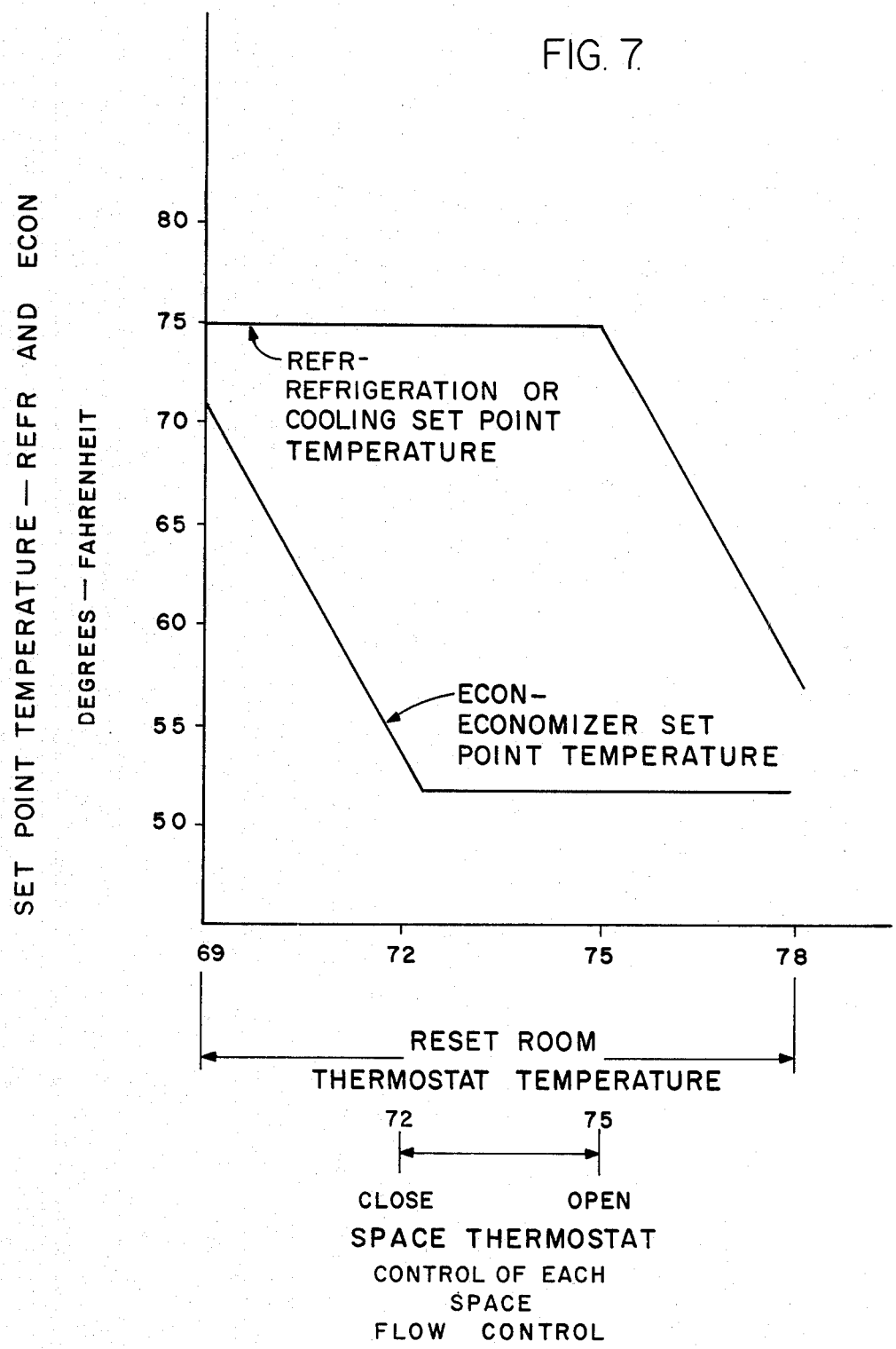

MICROPROCESSOR DISCHARGE TEMPERATURE AIR CONTROLLER FOR MULTI-STAGE HEATING AND/OR COOLING APPARATUS AND OUTDOOR AIR USAGE CONTROLLER

BACKGROUND OF THE INVENTION

Discharge air controllers are broadly old wherein an air duct supplies temperature conditioned medium, such as heated or cooled air, to a plurality of zones each of which has its own zone damper motor controlled by a space thermostat. In such systems, a plurality of stages of cooling or heating are controlled by a discharge air sensor to maintain the air temperature supplied to the zones at some predetermined temperature. One particular control is manufactured and sold by Honeywell Inc. as a W945A-G Single Zone Logic Panel shown in a publication Form No. 60-2195-3 revised 6-77. For best economy, the maximum use of outdoor air is broadly old so that when the enthalpy of the outdoor is low, the outdoor air dampers open to allow new air from outside to be introduced into the system and air is exhausted from the return air duct. One particular control is manufactured and sold by Honeywell Inc. as an H205A Enthalpy Control and shown in a publication Form No. 60-2301-6 revised 4-77. Many such controllers have been on the market, both as an integral package for connection to various sensors and controllers in a system and as a complete installed installation in a large building.

In many of these systems, efficiency of operation has been a concern; however, in the last few years with the cost of energy greatly increasing and its cost even anticipated to increase much more, the need for a better and more efficient controller for controlling a plurality of stages of temperature conditioning apparatus supplying conditioned air to a plurality of spaces is even more desirable.

SUMMARY OF THE INVENTION

The present invention provides for a discharge air temperature controller for controlling the temperature of air delivered to a plurality of spaces by bringing on operation of multi-stage heating and cooling apparatus and for controlling the amount of outdoor air used. In particular, the invention is concerned with resetting the temperature of the controlled temperature of the discharge air from the conditioning apparatus furnishing air to a plurality of areas or zones depending on the temperature or output of a reset comfort responsive means responsive to air temperature and/or humidity in a representative area or zone. By maintaining the discharge air temperature as high as possible during a refrigeration cooling operation, the air flow is maintained high to increase the efficiency of the cooling apparatus. Additionally, the reset responsive means controls the entry of outdoor air into the system, when the enthalpy is below a predetermined level, to obtain the maximum use of outdoor air for cooling to minimize the amount of operation of high energy consuming refrigeration cooling apparatus. By maintaining the discharge air temperature as low as possible during a cooling operation using outdoor air only, the air flow is maintained as low as possible to minimize blower energy consumption.

BRIEF DESCRIPTION OF DRAWINGS

FIG. 7 shows the set point temperature for refrigeration and the economizer throughout the range of the reset room thermostat temperature.

DESCRIPTION OF THE PREFERRED EMBODIMENT

Figure 1:
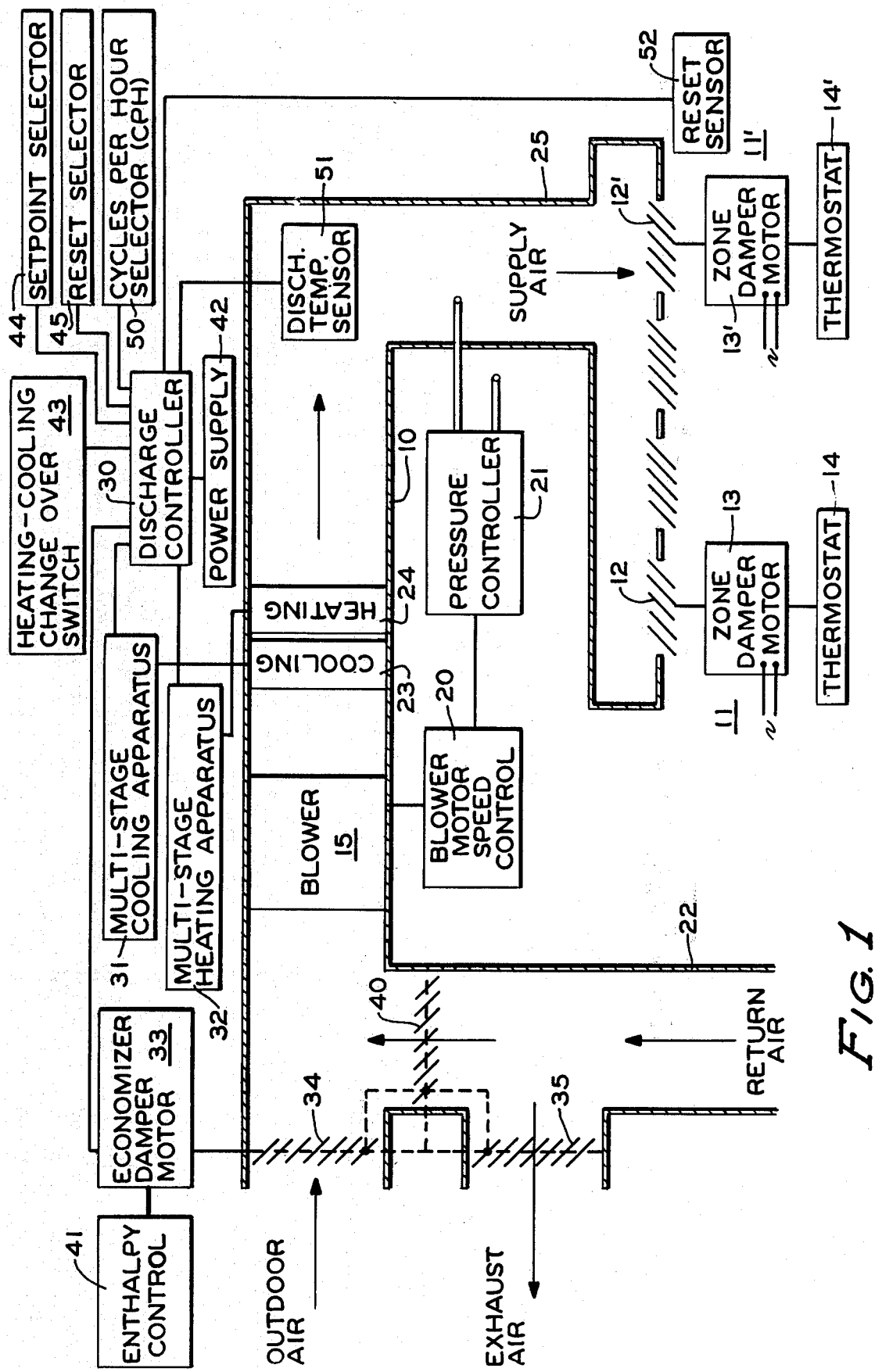
FIG. 1 is a schematic representation of a temperature conditioning system wherein conditioned air is delivered to a plurality of zones.

Referring to FIG. 1 a typical temperature conditioning system is shown wherein conditioned air is supplied through a duct 10 to a plurality of zones or areas, each of the zones such as zone 11 has its own damper 12 positioned by a damper motor 13 which is controlled by a zone thermostat 14. The air passing through duct 10 is moved under the power of a variable air volume blower 15 which in this example has a variable speed control 20 which is controlled by a conventional differential pressure controller 21 to maintain a predetermined air pressure in a supply or discharge duct 25. As the air passes from a return air duct 22 to the blower and through the exchangers or temperature conditioning coils (cooling coil 23 and the heating coil 24) the air is conditioned for delivery to these zones through supply duct 25.

A discharge air controller or panel 30 which is the heart or main part of the system is connected to control a multi-stage or modulating output cooling apparatus 31 and the multi-stage or modulating output heating apparatus 32. Controller 30 also controls a damper motor 33 for adjusting outdoor air dampers 34, exhaust dampers 35 and bypass dampers 40 to regulate outdoor air used in the conditioning system. The damper motor is controlled additionally by an enthalpy controller 41 of the H205A type previously mentioned. The discharge air controller 30 has a power supply 42, a heating-cooling changeover switch mechanism 43, a set point or temperature selector or potentiometer 44, a reset point or degrees of reset selector or potentiometer 45, and a cycles per hour selector or potentiometer 50. The set point selector 44 sets the temperature of the air to be maintained by the conditioning apparatus in the supply duct 25 at the discharge temperature sensor 51. The reset selector 45 determines the effectiveness of a reset condition sensor 52 which is contained in a representative zone such as zone 11'. Sensor 52 is a conventional sensor which responds to an environmental condition such as temperature and/or relative humidity. The actual reset temperature is selected by potentiometer 56 (as shown in FIG. 2) at the reset temperature sensor 52.

Figure 2:
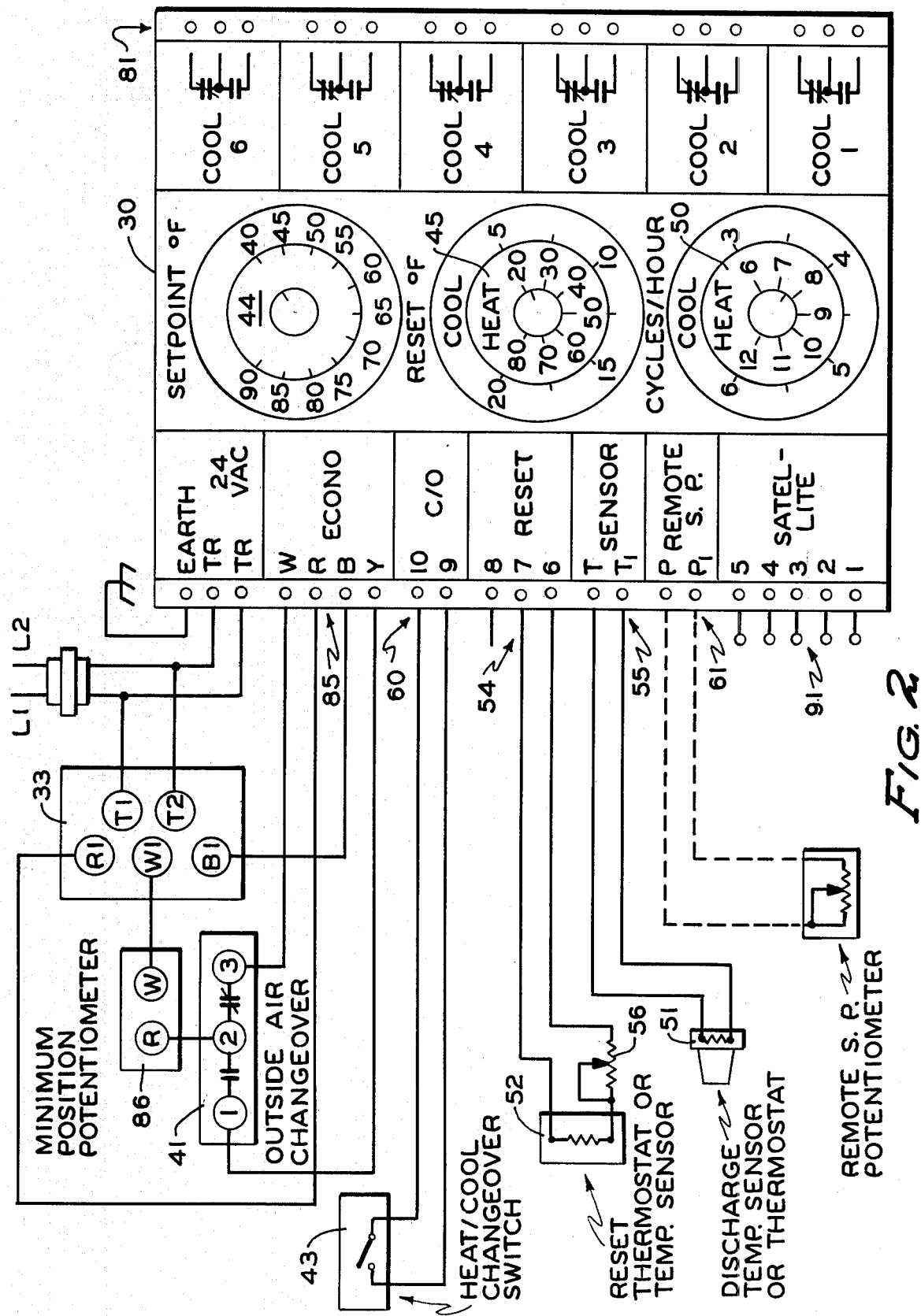
FIG. 2 is a pictorial showing of the discharge air controller panel with the various sensors and controllers connected thereto, FIGS. 3A, 3B and 3C when combined are the electrical circuit of the system and discharge controller shown in FIGS. 1 and 2.

FIG. 2 is a representation of the front panel of the discharge air temperature controller 30 showing the position of the various selectors and connections for the mentioned devices and switches of FIG. 1, and in this particular case, the outputs at 81 for the six cooling or heating stages are shown on the right-hand side of controller or panel 30. The inputs from the various sensors and motors are shown on the left-hand side.

Figure 3A:
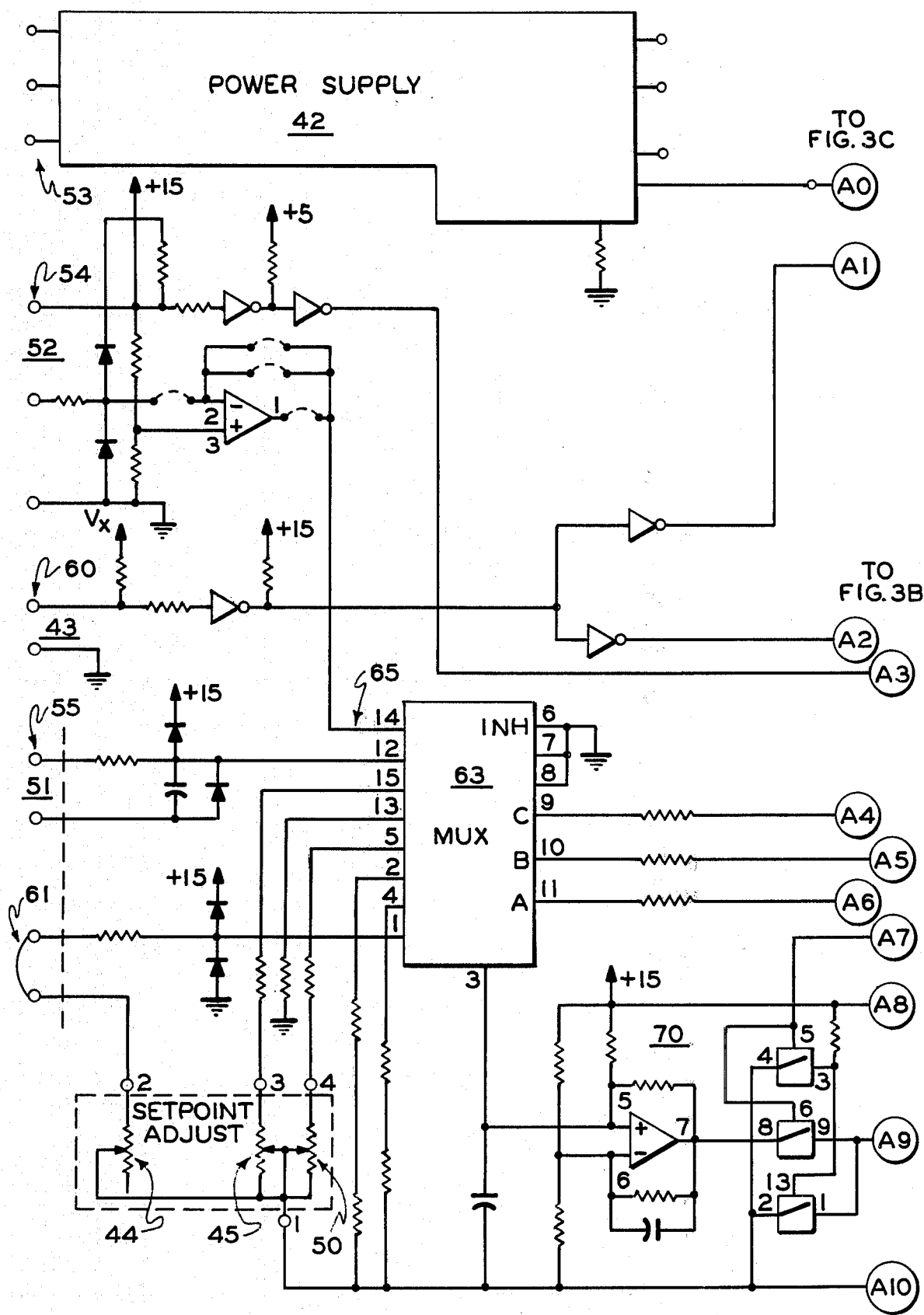
Figure 3B:
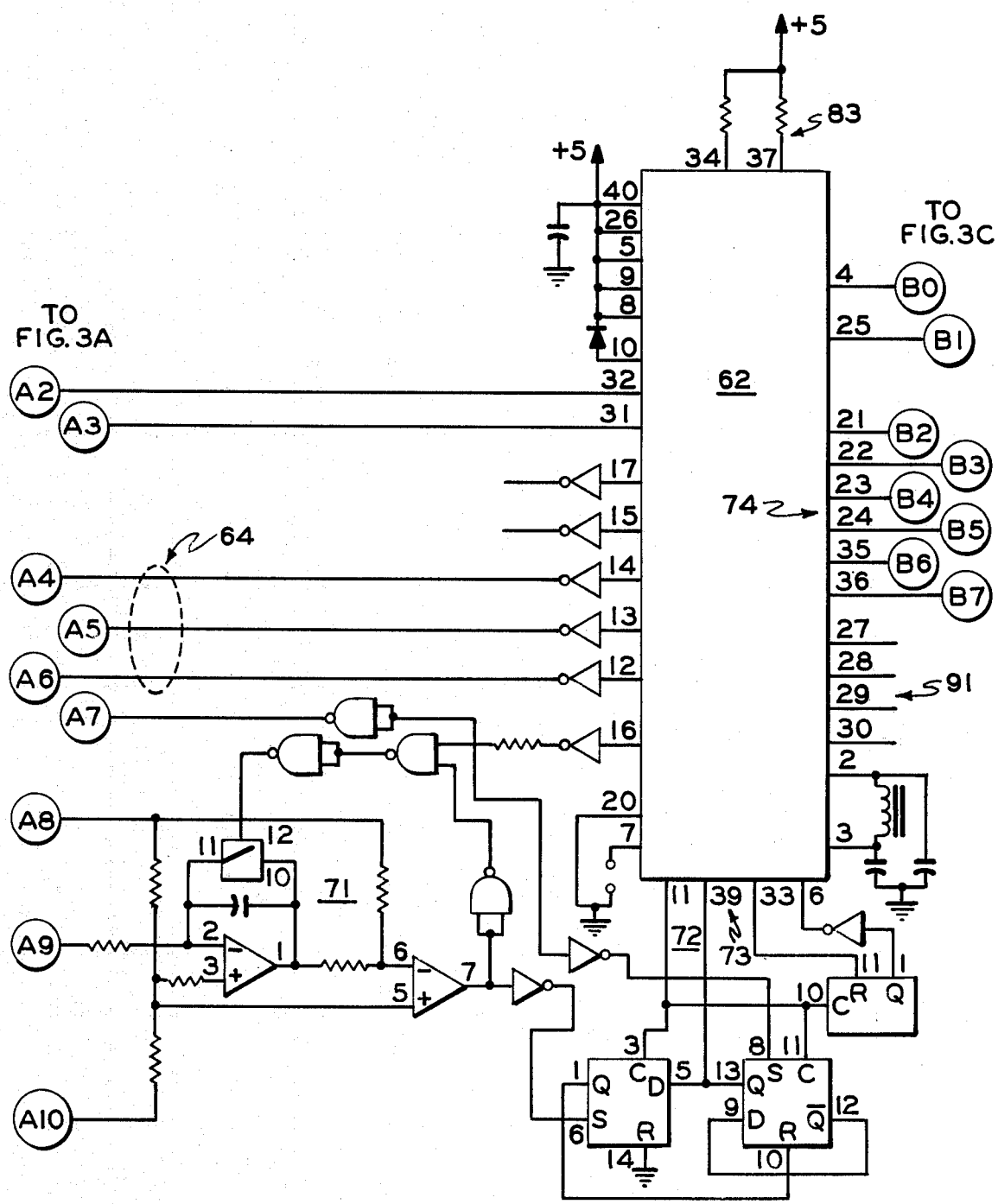
Figure 3C:
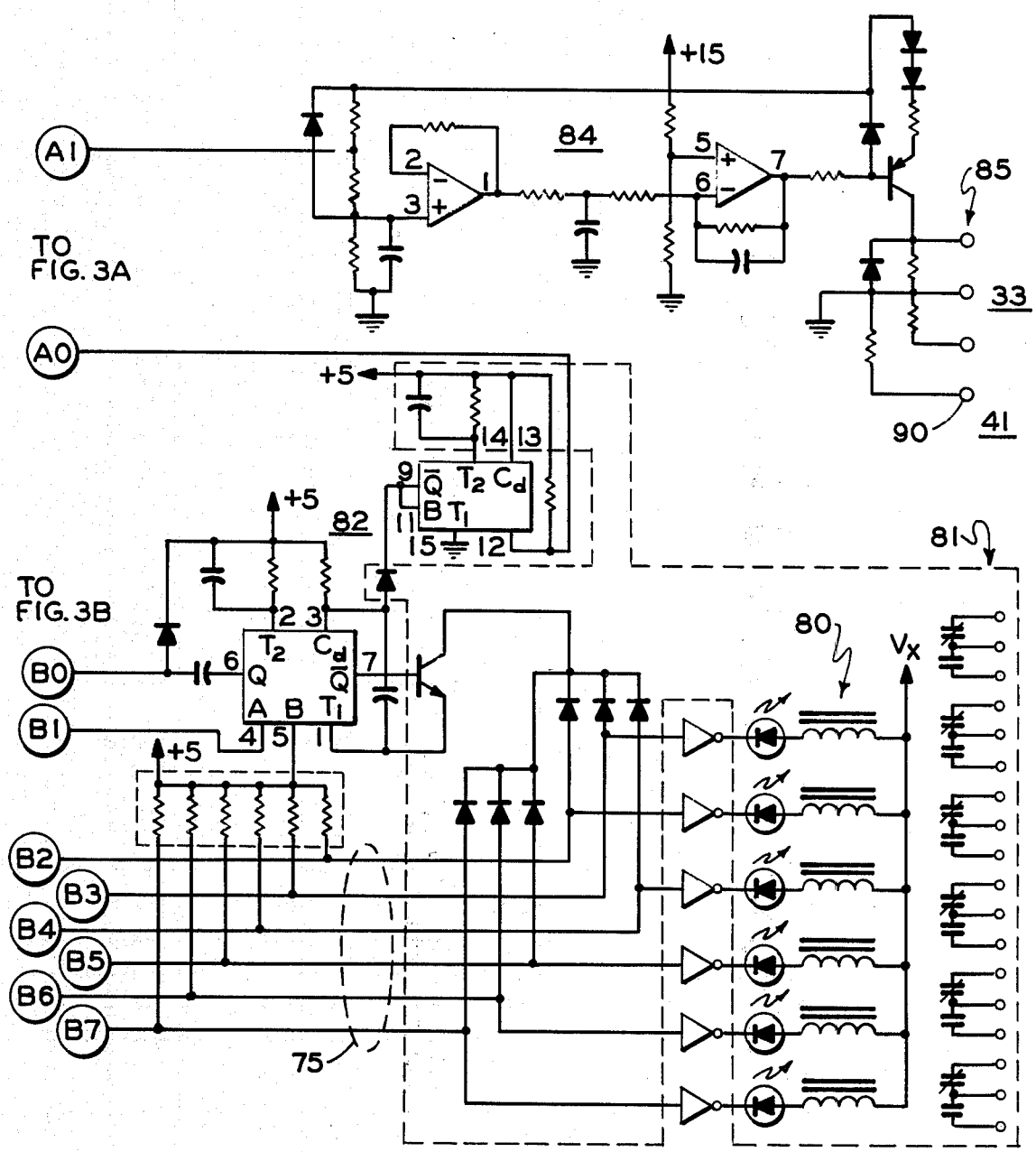

Referring to FIGS. 3A, 3B and 3C, the circuit diagram for discharge air controller 30 is shown. On the left-hand side of FIG. 3A, the various inputs are shown. Power supply 42 is connected to an outside source of power, such as 120 volt 60 cycle line, at terminals 53. The reset temperature sensor or thermostat 52 is connected to terminals 54. The discharge temperature sensor or thermostat 51 is connected to terminals 55. The changeover switch 43 is connected to terminals 60. An optional remote temperature selector may be connected to terminals 61.

By means of a conventional microprocessor 62 such as a Type No. ID8048 manufactured by Intel Corp., Santa Clara, Calif., having a program or read only memory (ROM) as shown in Appendix I, signals from the various sensors and control point adjustment devices of the system which are connected to the multiplexer 63 are fed into the microprocessor. Specifically, the microprocessor controls the multiplexer 63 over the control wires 64 by means of a binary decimal code (BCD) signal so that the inputs at 65 of multiplexer 63 are sequentially received at a fast rate and their outputs are fed through the dual slope analog to digital (A-D) converter 70 and into the integrator 71 having an output for the counting circuit 72 providing an input at 73 to the microprocessor.

The output of the microprocessor at 74 is connected over conductors 75 to switching relays 80 having output terminals 81 for connection to a plurality of stages of cooling and/or heating apparatus 31 and 32 depending upon the position of changeover switch 43. A conventional "watch dog" monitoring circuit 82 provides for a continual check of the microprocessor.

Another output 85 of the microprocessor is connected to the motor control circuit 84 for the outdoor air. The motor 33 is connected to the terminals 85. An input to the motor control circuit 84 from the enthalpy control 41 is connected to terminal 90. A minimum position potentiometer 86 is used with motor 33 to establish a minimum air flow for ventilation requirements. A satellite controller can be connected to microprocessor at terminals 91 to provide for the control of more stages of heating and/or cooling.

DESCRIPTION OF THE OPERATION OF THE PREFERRED EMBODIMENT

Referring to FIG. 1, as air is delivered from duct 25 to the plurality of zones or spaces 11 and 11' of the building in which the temperature is being controlled, the temperature of the air in duct 10 leaving the heating and/or cooling exchangers 23 and 24 is sensed by the discharge temperature sensor or thermostat 51. Depending upon the temperature selected by set point selector 44, the various stages of cooling and/or heating, depending upon what mode of operation the system is in, are turned off and on to maintain the cycle by cycle average discharge air temperature in duct 25 at the selected temperature.

Figure 4:
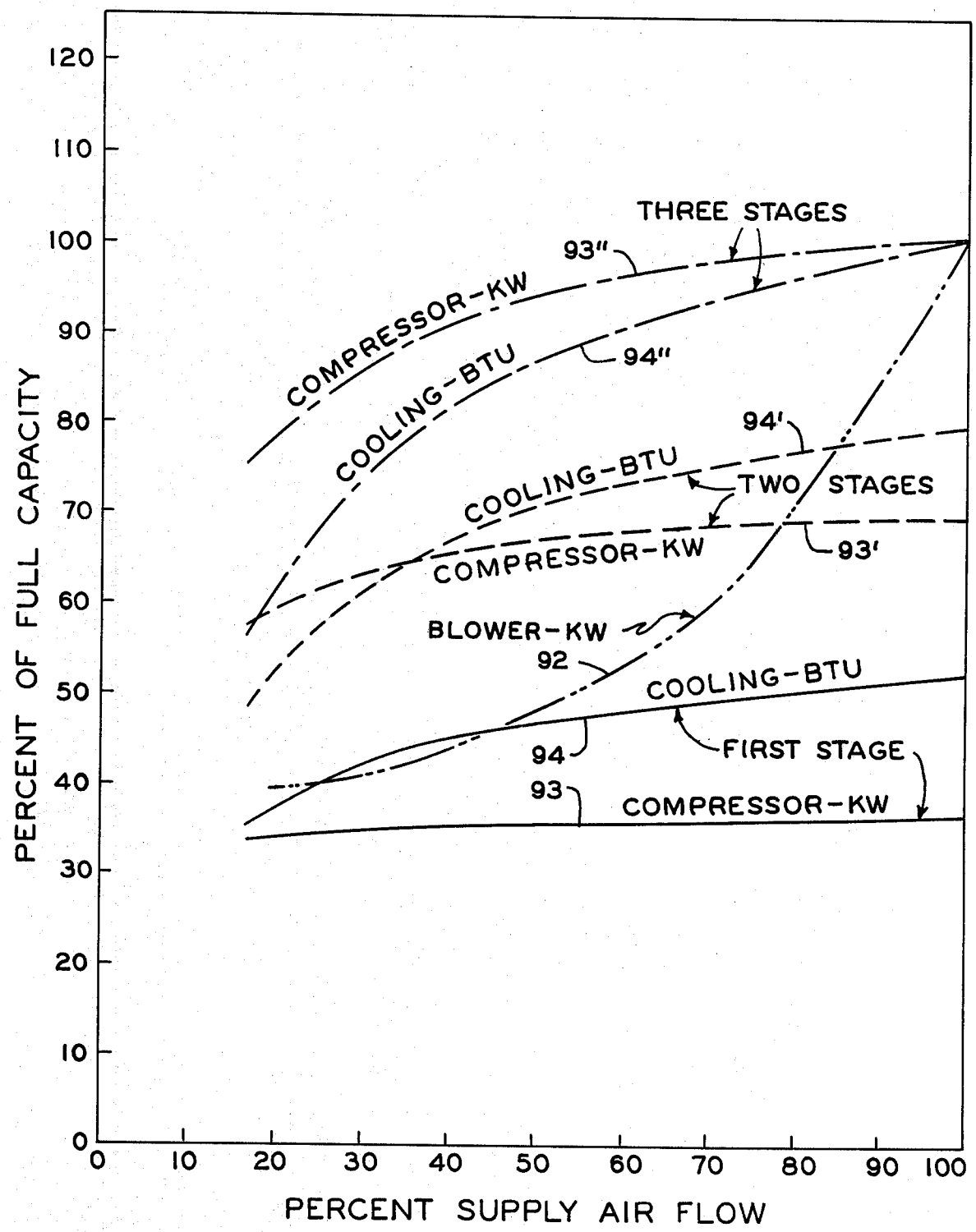
FIG. 4 is a graphical representation of the various parameters of the apparatus of FIG. 1 plotted with percent supply air flow from the system.

Certain modes of operation are needed to obtain the best efficiency and the maximum use of energy in such a system. Referring to FIG. 4, a graphical representation of various parameters and conditions of such a system are shown. These conditions and parameters are plotted as a function of percent supply air flow. As the air flow to the various zones changes with the position of the zone dampers from a minimum such as 20% total air flow, which is often maintained for ventilation purposes, to a maximum air flow of 100%, the various parameters will change. First of all, it is noted that, as the air flow increases, the power input or electrical kilowatts KW to the blower as shown by line 93 increases at a non-linear rate, thus for best efficiency when no refrigeration is used, the lower the air flow, the less power consumption in a system. By means of lines 93 and 94, the power input (KW) to one (first) stage of compressor operation of the refrigeration apparatus and the total cooling (BTU) provided by that first stage of cooling are shown. An increase in cooling as the percent air flow increases, is obtained with very little change in input power to the compressor. This is due to the additional air flow across the cooling coil and thus the added efficiency of heat transfer. With a greater cooling load to require more compressors operating, the power requirements (KW) increase; however, to increase the efficiency, the air movement through the heat exchangers is increased.

Again referring to FIG. 1, as the temperature of the discharge air is controlled in response to the temperature measured by discharge temperature sensor 51, the cooled air is delivered to the various zones by duct 25. A reset sensor 52 is connected to the discharge air controller to reset the temperature selected by the set point selector 44 depending upon the temperature and/or relative humidity of a representative space or zone. While the reset sensor 52 is shown as a thermostat, the sensor may be some other type of device such as a damper position responsive means to provide a signal indicative of the temperature or an environmental condition of the air of the zone. Reset sensor 52 changes the control point of the discharge air controller by an amount depending upon the reset selector 45. Reset sensor 52 must be located in a representative zone and its effect on system operation can be determined by selectors 44 and 45.

Figure 5:
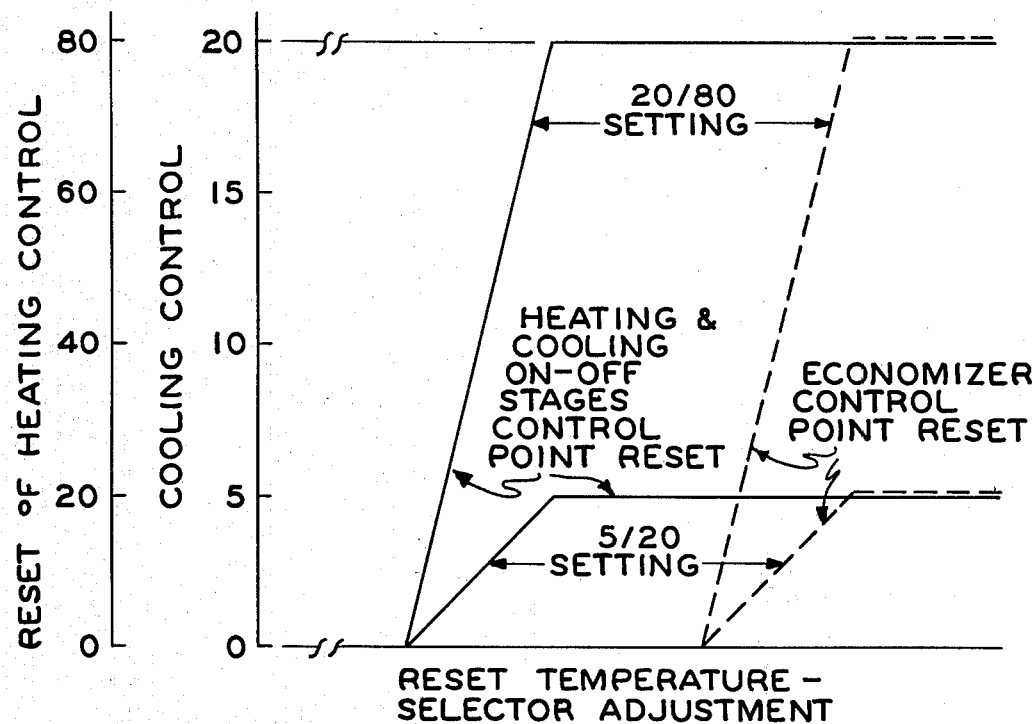
FIG. 5 is a graphical representation of the reset operation for the heating and cooling operation of the apparatus of FIGS. 1 and 2.

Referring to FIG. 5, a graphical representation is shown of the reset operation for heating and cooling as well as the damper motor control or economizer. The reset can be varied from 5-20 degrees Fahrenheit for cooling and from 20-80 degrees Fahrenheit for heating by the reset temperature selector adjustment as shown in the dial indicator of FIG. 2 for the reset selector 45. One particular setting of reset is shown in the graphical representation of an operation in FIG. 6. The reset controller has been set for the 20 degrees during a cooling operation.

Figure 6:
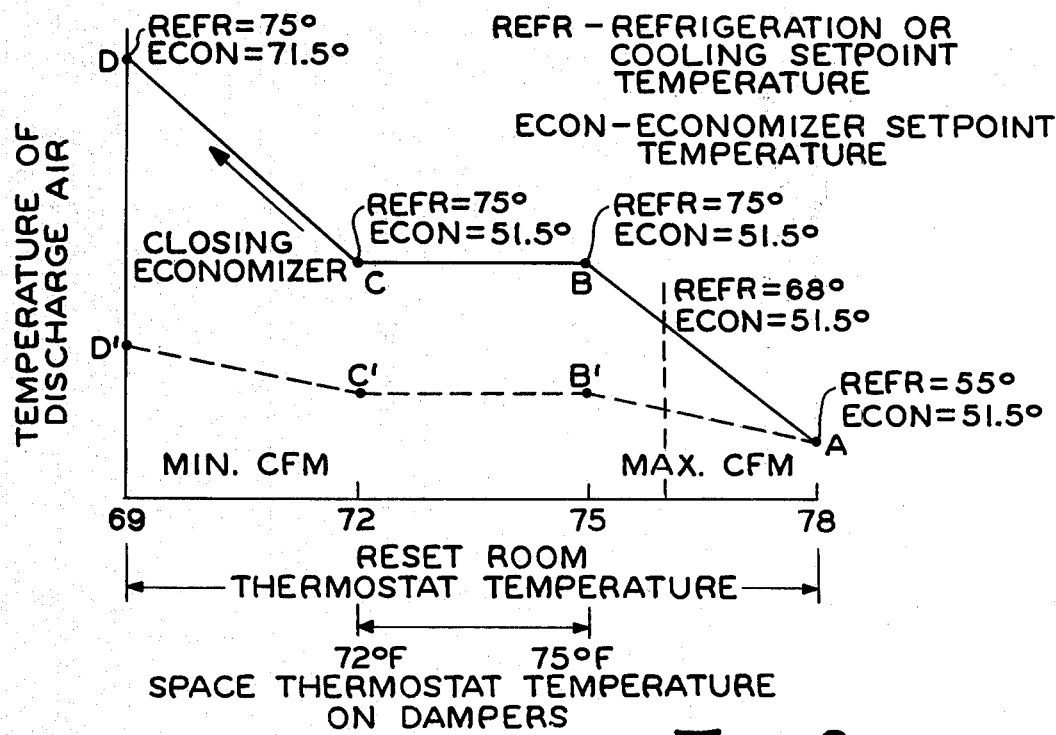
FIG. 6 is a graphical representation of the control point adjustment for the discharge air to obtain a maximum use of the outdoor air and mechanical cooling as a function of the air temperature in the vicinity of reset sensor.

Specifically referring to FIG. 6, a graphical representation of the temperature of the discharge air for the various temperatures of the reset sensor 52 is shown. For explanation purposes, it is shown that the space thermostats of the various zones are set to control the dampers from closed or partially closed to a fully open position between 72 degrees and 75 degrees. If all dampers are open when the space thermostats are at 75 degrees, a maximum air velocity is experienced in the system.

The graphical representation of FIG. 6 and FIG. 7 shows the mechanical cooling or refrigeration set point temperature (Refr) or control point and the economizer set point temperature or control point as it is adjusted over the range of the reset thermostat temperature varying from 69 to 78 degrees. Depending upon the discharge air temperature, an explanation of the operation at any reset temperature can be obtained. Let us assume that the reset thermostat selector 45 is set at 20 degrees Fahrenheit for a cooling operation, the discharge air temperature set point selector 44 is set at a 55 degrees temperature. Reset temperature sensor 52 is set by potentiometer 56 at 78 degrees Fahrenheit.

For a start up condition of the system further assume that the temperature in the representative zone near sensor 52 is 78 degrees Fahrenheit. Controller 30 has fully opened the economizer motor at 85 and energized all of the stages of cooling at 81 and the temperature in duct 25 begins to drop to 55 degrees Fahrenheit.

With such a start up operation, it is assumed that the zones are all overheated and above a temperature of 75 degrees so that the zone dampers are wide open and a maximum air flow is being delivered to each zone and to duct 25. The blower control 20 would be adjusted to deliver a maximum air flow and a maximum air flow would be passing through the cooling heat exchanger 23 for best efficiency. As shown in FIG. 6, the operating position would be to the far right of the drawing with a reset room thermostat temperature at 78 degrees and the refrigeration set point temperature at 55 degrees, and the economizer set point temperature at 51.5 degrees. With these settings, controller 30 would be operating as many compressors as needed to supply the cool air through supply duct 25, and if the temperature of the air dropped below 55 degrees, stages of refrigeration would be turned off in a sequential manner by controller 30. Obviously, if the temperature of the reset sensor 52 in the representative zone remained at 78 degrees, 55 degree air would be delivered to the zones with a full output of the operation of the multi-stage cooling apparatus 31. However, with a properly sized system, the temperature in various zones would begin to decrease and the reset temperature of sensor 52 would begin to drop. As the reset temperature dropped between 78 and 75, control apparatus 30 would adjust the refrigeration or cooling set point temperature as shown on the line A-B. Therefore, when the reset temperature dropped to 75 degrees, the refrigeration or cooling set point temperature would be readjusted to 75 degrees. During this cooling operation, as long as the enthalpy control 41 allowed for maximum outdoor air, the economizer motor 33 would be fully open as its control point would remain at 51.5 degrees throughout the operation from A to B. At any time along this line, if the average duct temperature dropped below the refrigeration set point temperature, sequential stages of the cooling apparatus 31 would be turned off, and if, after all stages of the cooling apparatus were off, the duct temperature continues to drop below 51.5 degrees, the economizer motor would close the outside air dampers.

By positioning the reset sensor 52 in a representative zone, a maximum air flow would be assured as the bulk of the zones would not be satisfied and their dampers would be wide open. A further reduction of the reset temperature at sensor 52 would result in an operation along the line B-C wherein the refrigeration or cooling set point temperature remained at 75 degrees and the economizer at 51.5 degrees. This range of operation is to allow for stability and would allow for the control of the zones by the amount of air flow delivered to the zones as the damper motors would be driven from the fully open position at 75 degrees to the minimum closed position at 72 degrees.

With the bulk of the zones satisfied at operating point C, a further reduction in the reset temperature sensor 52 would result in an operation along the line C-D at which time the refrigeration or cooling set point temperature would be increased. With such an operation, the air flow would be lower as many of the zones would be closed, and if available, the bulk of the cooling would be obtained from the outdoor air.

With such a system, a minimum air flow is provided in the range of operation where less cooling is needed to maintain less power consumption, and by the same token, during the cooling operation with a higher reset temperature, a higher amount of air flow is provided to obtain the best efficiency of heat transfer to the cooling heat exchanger 23.

These and other advantages of the present invention are set forth in the appended claims, in which we claim:

1. An improvement in a temperature control apparatus for controlling temperature conditioning apparatus having an outdoor air supply apparatus and a mechanical cooling apparatus for supplying temperature conditioning air to a plurality of zones by a blower, each of the zones having its own zone thermostat and air supply control means, the temperature control apparatus having a discharge air duct temperature sensor connected to control the temperature conditioning apparatus and adapted to respond to the temperature of the air delivered to the zones, and a second sensor adapted to respond to an environmental condition of a representative zone, the improvement comprising first means responsive to the output of said second sensor for controlling the temperature of air delivered to the zones by adjusting the control temperature of said discharge temperature sensor as an environmental condition of said representative zone changes to maintain a maximum use of the mechanical cooling apparatus when said condition of the representative zone is in the highest range and a maximum use of outdoor air when said condition of the representative zone is in the lowest range.

2. The invention of claim 1 wherein said second sensor responds to the relative humidity.

3. The invention of claim 1 wherein said second sensor responds to space temperature.

4. A temperature control apparatus for controlling temperature conditioning apparatus having damper control means to use a selected amount of outdoor air and mechanical air cooling means for temperature conditioning the air air delivered under the power of a blower means through a duct to a plurality of zones, each of the zones having its own temperature responsive control for controlling a zone air flow control means and thus the delivery of conditioned air from the duct to its zone, comprising control apparatus adapted to control the set point temperature of the damper control means and the set point temperature of the mechanical air cooling means of the air conditioning apparatus to vary the temperature of the air delivered through the duct to the zones, first temperature responsive means adapted to respond to the temperature of the air in the duct being delivered to the zones, second responsive means adapted to respond to an environmental comfort condition of the air in a representative zone, temperature set point adjustment means, further means connecting said first temperature responsive means, said temperature set point adjustment means, and said second responsive means to said control apparatus, said first temperature responsive means varying the output of said control apparatus and thus the capacity of the air conditioning apparatus to maintain a temperature of air in the duct as selected by said set point adjustment means, said second responsive means resetting the relationship of said set point adjustment means and said first temperature responsive means to change the set point temperature of the damper control means in a first range of environmental condition and to change the set point temperature of the mechanical air cooling means in a second range of environmental condition to maintain a selected air temperature in the duct as the environmental condition in the representative zone changes.

5. The invention of claim 4 comprising means connected to said control apparatus to provide for said resetting in a manner to raise the controlled temperature of the air of the damper control means through a first range when said condition of the representative zone decreases in a first range, and to provide for said resetting in a manner to lower the controlled temperature of the mechanical cooling through said second range when said condition of the representative zone increases in the second range.

6. The invention of claim 5 wherein said second responsive means is a temperature responsive means and comprising a third range of said condition intermediate said first and second ranges.

7. The invention of claim 6, comprising means responsive to the enthalpy of outdoor air, means adapted to connect said means responsive to enthalpy to the damper control means to determine when outdoor air is to be used for cooling.

8. The invention of claim 6 comprising pressure responsive control means adapted to be mounted in the duct, means adapted to connect said pressure responsive control means to control the capacity of the blower means and thus the delivery of air through the duct to maintain a predetermined pressure in the duct and thus as the flow of air to the zones changes the capacity of the blower means changes.

9. The invention of claim 8 wherein during said second range of temperature a maximum air flow is expected to increase the efficiency of heat transfer through a heat exchanger of the mechanical air cooling means and reduce the power requirements, and during said first range of temperatures a minimum air flow is expected of the blower means to reduce the power requirements of the blower means.

10. The invention of claim 6 comprising means to adjust the resetting action of said second responsive means to provide for different set point levels of operation in said first, second and third ranges.

11. The invention of claim 5 wherein said second responsive means responds to temperature in the representative zone.

12. The invention of claim 4 wherein said further means connecting is a microprocessor.

* * * * *